United States Patent [19]
Young

[11] Patent Number: 5,368,247
[45] Date of Patent: Nov. 29, 1994

[54] SPINNING REEL WITH EXCELLENT HEAT TRANSFER AND NON-TANGLE CHARACTERISTICS

[76] Inventor: John N. Young, 35 Berry Trail, Fairfax, Calif. 94930

[21] Appl. No.: 893,763

[22] Filed: Jun. 5, 1992

Related U.S. Application Data

[60] Continuation-in-part of Ser. No. 706,252, May 28, 1991, abandoned, which is a division of Ser. No. 165,769, Mar. 9, 1988, abandoned, which is a continuation-in-part of Ser. No. 886,884, Jul. 18, 1986, Pat. No. 4,730,782.

[51] Int. Cl.⁵ .............................................. A01K 89/01
[52] U.S. Cl. .................................... 242/231; 242/246
[58] Field of Search ................ 242/231, 232, 233, 246

[56] References Cited

U.S. PATENT DOCUMENTS

| | | | |
|---|---|---|---|
| 2,773,654 | 12/1956 | Hübner | 242/233 |
| 4,291,846 | 9/1981 | Carpenter | 242/233 |
| 4,792,106 | 12/1988 | Hlava | 242/233 |
| 5,022,605 | 6/1991 | Carlsson | 242/233 |
| 5,193,762 | 3/1993 | Takeuchi | 242/232 |

*Primary Examiner*—Katherine Matecki
*Attorney, Agent, or Firm*—Harold D. Messner

[57] ABSTRACT

In accordance with this invention, a spinning reel having non-snagging bailing characteristics, is described. Such spinning reel together: accommodates ultra-long casts and subsequent winding of associated fishing line without tangling the line. In one aspect, the invention includes a lockable, rotatable rotor having a pair of diametrical positioned ear assemblies extending from its base, a central cylindrical housing and at its interior, a hollow pinion gear in rotational contact with the central cylindrical housing. The ear assemblies are slotted to receive a U-shaped bail wire while broad walls provide non-snag surfaces to the fishing line.

19 Claims, 3 Drawing Sheets

SPINNING REEL WITH EXCELLENT HEAT TRANSFER AND NON-TANGLE CHARACTERISTICS

RELATED APPLICATIONS

This application is a continuation-in-part of Ser. No. 07/706,252 filed May 28, 1991 for "LIMITED AREA DRAG MECHANISM FOR FISHING REEL", now abandoned which is a divisional of Ser. No. 07/165,769 filed Mar. 9, 1988, now abandoned which is a continuation-in-part of Ser. No. 06/886,884 filed Jul. 18, 1986 now U.S. Pat. No. 4,730,782 issued Mar. 15, 1988.

SCOPE OF THE INVENTION

This invention relates to spinning reels having drag capability (i.e., allow slippage in the line reeling system when tension on the line exceeds a set point level), and more particularly, to such reels having a drag mechanism in combination with a non-snagging bail system that together: accommodates ultra-long casts without tangling the line as well as provides for easy winding-non-snagging-characteristics for the line.

In one aspect, the bail system includes a spinning rotor and a U-shaped bail wire that combine to guide fishing line onto or off a spool assembly axially positioned adjacent to the rotor as well as allows the bail wire to be rotated about an axis normal to the axis of rotation of the rotor to lock the spool assembly during casting of the line. At the ends of the U-shaped bail wire are diametrical positioned upright ear assemblies extending from the base of the bail rotor that are slotted to receive the ends of the bail wire either directly (via first slotted bearing directly connected to an end of the bail wire) or indirectly via a line roller attached to an off-center bail arm that extends through the slot to a second slotted bearing. The bearings each having a central opening to attach to an integrally formed button at the interior of each ear assembly. The outer surfaces of the broad walls of the ear assemblies present smooth, non-snagging surfaces along their entire height, from their base to the overhead arches adjacent to the slots from which the bail wire or bail arm extend.

BACKGROUND OF THE INVENTION

Fishing reels are generally provided with drag mechanism that allow some slippage in the line reeling system when tension on the line exceeds a pre-selected set point level. Thus, when tension imposed by a hooked fish becomes excessive, the drag mechanism allows some line to be played out and avoid the likelihood of the line snapping.

Conventional drag mechanism generally incorporate a series of annular washers, alternately of metal and of a high friction material stacked face-to-face relative to a stop in a drag stack. Means are provided to compress the stack an adjusted amount in order to set the set-point level of the drag, i.e., the amount of tension on the line that can be tolerated in reeling the line in. When that tension is exceeded, the drag mechanism will slip and line will be played out.

Experience has shown that conventional spinning reels have common problems related to their inability to operate smoothly in both casting and winding modes of operations, and their relatively short life spans resulting from rapid wear of surfaces. As taught in my aforesaid patent, the provision of a small friction area relative to the drag diameter has proven to be a distinct advantage and produces improved drag performance. But neither the improving non-tangling capability nor maintaining spool integrity of spinning reels is taught or hinted at.

SUMMARY OF THE INVENTION

In accordance with this invention, a spinning reel having non-snagging bailing characteristics, is described. Such spinning reel together: accommodates ultra-long casts without tangling the line as well as provides for easy winding characteristics for the line.

In one aspect, the bail system includes a lockable, rotatable rotor having a pair of diametrical positioned ear assemblies extending from its base, a central cylindrical housing and at its interior, a central opening fixed to a rotatable pinion gear via a pinion nut. The pinion in turn is hollow to accommodate a main drive gear of the reel that runs almost the entire length of the reel. The ear assemblies are slotted to receive the bail wire over end walls while broad walls provide smooth, non-snag surfaces to the line.

In more detail, the bail system includes a lockable, rotatable rotor having a pair of diametrical positioned ear assemblies extending from its base, a central cylindrical housing and at its interior and a central opening fixed to a rotatable pinion gear via a pinion nut. The pinion gear is hollow to receive a main drive shaft. Fixed to the far end of the main shaft is a spool assembly. At the other end of the shaft extending through and beyond the hollow pinion gear is a worm gear also in driving contact with the main drive gear through slider-pawl assembly that causes the shaft to oscillate along the axis of rotation of hollow pinion gear. The combination of the worm gear and slider-pawl assembly allows the spool assembly to move back and forth (oscillate) over a fixed length relative to the rotor. In casting position, the rotor is locked against rotation by pivoting the bail wire in a first direction relative to the diametrically opposed ear assemblies. Each of the ear assemblies of the rotor is of a hooded design. The parallel broad walls form a cavity at their interior. The end edges are slotted over a remote end (opposite to their attaching end) to receive the ends of the bail wire either directly (via a first slotted bearing) or indirectly via a line roller of the bail arm into which a second end of the bail wire attaches (in turn, the bail arm penetrates the slot into attachment with a second slotted bearing). Each bearing has a central opening to attach to an integrally formed button at the interior of one of the broad walls. At their exterior, such broad present smooth, non-snagging surfaces relative to the fishing line during operations. The slotted bearings also allow easy rotation of the bail wire.

DESCRIPTION OF PREFERRED EMBODIMENTS

Figure 1:
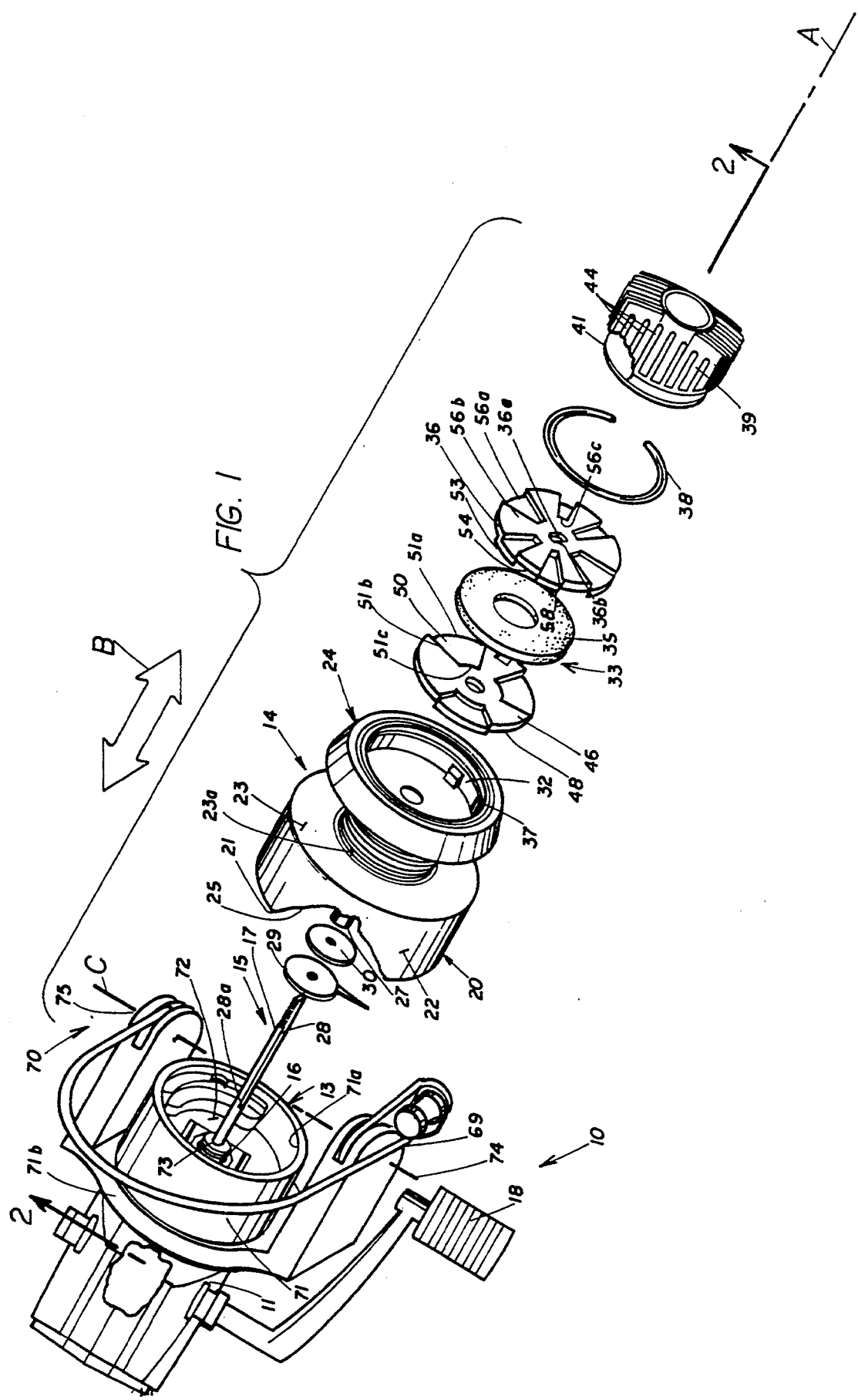
FIG. 1 is a perspective view partially cut-away and exploded, of a spinning reel embodying the present invention.
Figure 2:
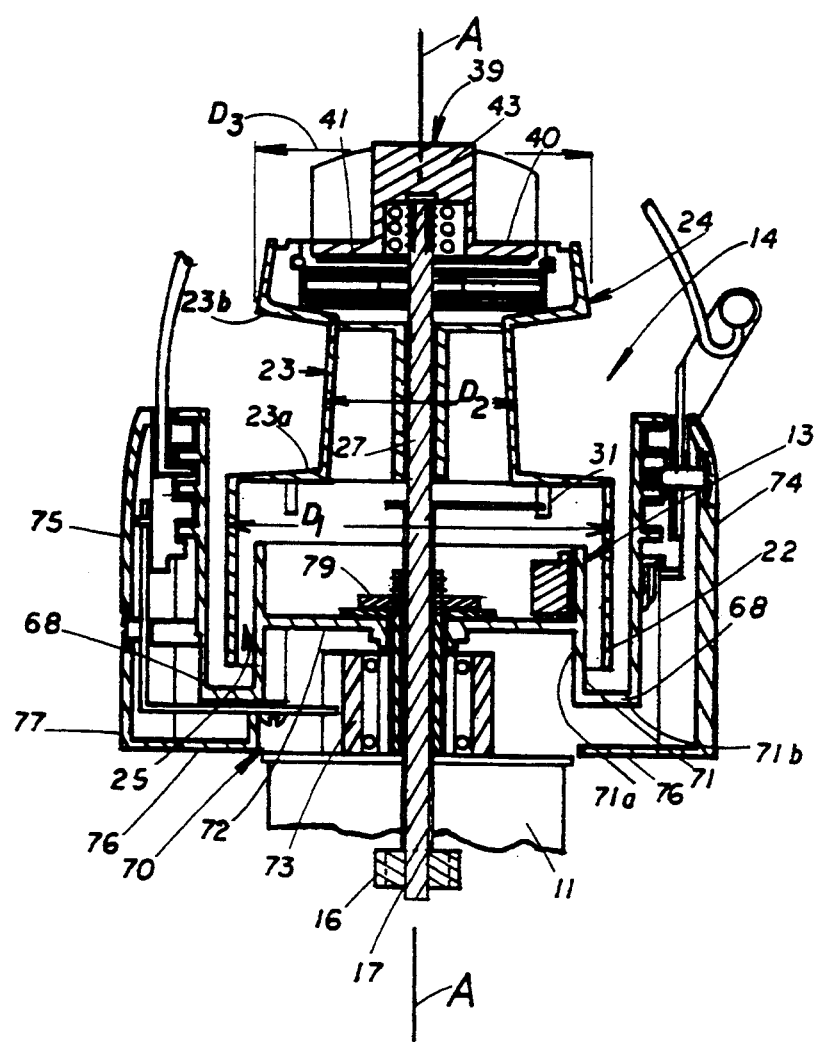
FIG. 2 is a section view taken along line 2—2 of FIG. 1 illustrating the drag mechanism and bailing system of the invention.
Figure 3:
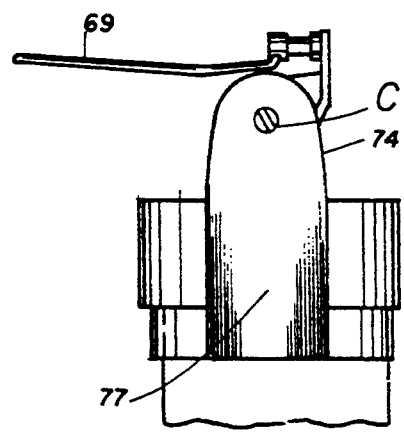
FIGS. 3 and 4 are side views of the reel of FIG. 1 to illustrate the bailing system of the invention.

A spinning reel 10 of FIGS. 1 and 2 which embodies features of the present invention has reel body 11 which has attached thereto a rotor 13 and a spool assembly 14 in telescoping, axially adjacent position relative to each other.

At its interior, the reel 10 has a drive system generally indicated at 15 that includes a pinion gear 16 that rotates the rotor 13. The drive system 15 also drives a main oscillating shaft 17 that extends through the hollow pinion gear 16. The main shaft 17 runs almost the length of the reel body 11 and is provided reciprocating movement during winding operations, such linear movement along axis of symmetry A of the reel 10 in the direction of arrows B. Both rotation of the pinion gear 16 and movement is provided in usual fashion: such as shown in U.S. Pat. No. 3,144,217 for "FISHING REEL", G. A. WOOD modified to allow the use of a pinion gear 16 to cause rotation of the rotor 13. A master gear (not shown) is fixed to and rotates with handle 18 along a common axis. The master gear is a twin spur gear combination in which the smaller of the spur gears is used to drive the pinion gear 16 to cause rotation of the rotor 13. Linear movement of the main shaft 17 is provided by the larger of the spur gears being in meshing contact with an oscillating pinion gear those broad surface is pivotally attached to one end of a link or slider (also not shown) at an eccentric position offset from the axis of rotation of the oscillating pinion gear. The other end of the link extends to pivotally attach to a pin affixed at the far end of the main shaft 17. In that way rotation of the master gear is converted into reciprocating movement of the main shaft 17 as well as rotation of the rotor 13. In that way both rotary and rectilinear movement is simultaneously provided the reel 10 of the invention by rotation of the master gear via the handle 18. Moreover, since such driving system 15 is conventional in design and operation in the spinning reel art, details of its operation will be omitted for the sake of brevity except to note that during winding operations of the reel 10, the driving system 15 causes the rotor 13 to rotate in a fixed plane about an axis of rotation coincident with axis of symmetry A, while the main shaft 17 is caused to undergo reciprocating movement of the spool assembly 14 in the direction of arrows B.

The spool assembly 14 includes a cylindrical main body 20 whose side wall 21 has its largest diameter over a skirt segment 22, its smallest diameter over a spool segment 23 and an intermediate diameter over a dish segment 24. The spool segment 23 includes a continuous side wall 23a concentric of a centering pipe 27 through which the main shaft 17 extends. The centering pipe 27 terminates in contact with shoulder 28a of a flat 28 on the main shaft 17, such shoulder 28a forming a stopping surface for the spool assembly 14. A clicker arm 29 and washer 30 have a mating flat to fit onto flat 28 of the shaft 17 against the stopping shoulder 28a of the shaft 17.

FIG. 2 shows the positioning of the centering pipe 27 in more detail. As shown, the centering pipe 27 is concentric of skirt segment 22, spool segment 23 and dish segment 24. That is, the diameters D1, D2, and D3 of the skirt, spool and dish segments 22, 23, 24, respectively, are much greater than that of the centering pipe 27, wherein D1>D3>D2. Note that a series of stops 31 (two of which are shown) on wall 23a of spool segment 23 engage the clicker arm 29 as drag rotation of the spool assembly 14 occurs. The stops 31 also extend within central cavity 25 of the spool segment 22 atop and adjacent to rotor 13.

Returning to FIG. 1, the dish segment 24 includes flat broad surface 32 onto which is secured drag stack 33 of the invention, comprising metal eared pressure ring 34, friction washer 35 and pressuring ring 36. The dish segment also includes side wall 37 grooved to receive Cee-shaped retaining ring 38. Note the grooves for retaining the drag stack 33 is sufficiently long to permit axial, squeezing movement to be applied to the drag stack 33 via rotation of the cap nut 39.

As shown in FIG. 2, the cap nut 39 is metallic and resembles a modified top hat in which brim 40 includes a separate spring-loaded base 41 and a crown 43 threaded to attach to the threaded segment of the main shaft 17. Between the brim 40 and crown 43 are a series of fins 44 (see FIG. 1) in heat transfer with the air surrounding the reel 10.

In operations as shown in FIG. 1, while the main cylindrical body 20 of the spool assembly 14 is slidably and rotatably carried on the main shaft 17, rotation only occurs when the drag set point level of the drag stack 33 is exceeded. The drag stack 33 is formed by a "sandwich" of the pressure ring 36, intermediate friction washers 35, and at the end, the eared pressure ring 34 onto broad surface 32 of the dish segment 24. The pressure ring 36 is slidable on the main shaft 17 but with complementary flat surface 36a at its central opening 36b, it does not rotate during drag rotation. Hence the pressure ring 36 may be forced along the shaft 17 to engage the friction washer 35 and squeeze it against the eared pressure ring 34 attached to surface 32 of the dish segment 24. Hence, the more the drag stack 33 is squeezed, the tighter the friction washer 35 will grip the eared pressure ring 34 and the pressure ring 36. The higher the drag setting, the greater the pull on the line (not shown) that can be withstood.

In accordance with the invention as shown in FIG. 1, the eared pressure ring 34 has a series of lands or protrusions 50 in contact with the friction washer 35. The protrusions 50 are pie-shaped and are separated from each other by inverted recessed segments 46 integrally formed on pressure ring 34. The inverted segments 46 are shaped like the protrusions 50 in plan view, but each has a back surface 48 extending beyond that of the protrusions 50. Such back surfaces 48 are also placed in heat transfer contact with flat surface 32 of the dish segment 24. Note also that the protrusions 50 have outer arcuate edges 51a coincident with its circumferential edge, side edges 51b and inner arcuate edges 51c off-set from central opening 52. The function of protrusions 50 and recessed segments 46: offer reduced areas for engagement with friction washer 35 so that drag operations are smooth and heat is efficiently removed.

In similar manner, the pressure ring 36 also provides integrally formed protrusions 53 separated by inverted recessed segments 54, the former being in contact with friction washer 35. The protrusions 53 are also pie-shaped; and have outer arcuate edges 56a coincident with its circumferential edge, side edges 56b and inner arcuate edges 56c off-set from central opening 36b. The function of protrusions 53 and recessed segments 54 are the same as previously mentioned with respect to protrusions 50 and segments 46: heat generated by contact with friction washer 35 is efficiently removed via the cooler temperature of the segments 54 vis-a-vis that of the protrusions 53.

WINDING AND BAIL SYSTEM

FIGS. 1-6 illustrates winding and bailing system 70 of the invention in more detail.

Beginning with FIG. 1, note the system 70 combines with the operation of the rotor 13 for the twofold purposes of aiding the application (or loosening) of hoops of fishing line (not shown) about the spool assembly 14. During the winding function, such fishing line is attached or detached from the spool assembly 14 via rotation of the rotor 13 (clockwise or counter clockwise) through handle 18. But with the rotor 13 locked against rotation via rotation of bail wire 69 about bail pivot axis C, the system 70 also functions to permit hoops of fishing line to be removed from the spool assembly 14 by the momentum of the object attached to the line (casting function). Such casting function occurs without rotation of the rotor 13.

Now in more detail, the system 70 includes a cylindrical inner hub 71 disposed within cavity 25 of the skirt segment 22 of the spool assembly 14. The hub 71 has a side wall 71a fitted with a circular partitioning wall 72 about midway therealong through which pinion gear 16 and shaft 17 penetrate. A lock nut 79 secures the pinion gear 16 and shaft 17 relative to the partitioning wall 72. The upright side wall 71a of the hub 71 is also seen in FIG. 1 to be outwardly formed with a shoulder segment 71b at the base of the hub 71. The shoulder segment 71b is circular in cross section as is the side wall 71a. Attached to and cantilevered from diametrically opposed positions of the inverted segment 71b are L-shaped ear assemblies 74, 75. Each ear assembly 74, 75 attach over a sector of the shoulder segment 71b at the base of the system 70 and provide for bailing functions as described below in detail.

FIG. 2 shows that the ear assemblies 74, 75 are integrally formed relative to the shoulder segment 71b, the termination of the latter generally occurring at 68. In addition, note that a bearing 73 is attached to main body 11 about pinion gear 17 to facilitate rotation of the rotor 13 and spool assembly 14 as explained below.

As shown in FIGS. 3-6, each ear assembly 74, 75 includes a pair of smooth cover members 74a, 74b and 75a, 75b each of a box-like construction. That is to say, the pairs of cover members 74a, 74b and 75a, 75b clamp together about an axis of symmetry B at a series of parameter-defining, raised edges. Such edges include floor edges 80a, side edges 80b, 80c normal to the floor edges 80a and arched crown edges 80d. After the pairs of cover members 74a, 74b, 75a, 75b are clamped together, each of the pairs of cover members 74a, 74b and 75a, 75b includes a transverse base segment 76 of rectangular cross section, a pair of spaced apart upright leg segments 77, an arcuate, smooth crown segment 78 and a back cover segment 79. Note that base segments 76 of the inner cover members 74a, 75a connect to shoulder segment 71b at 68. And the back cover segments 79 of the outer cover members 74b, 75b are convexly formed adjacent to crown segment 78 to form a smooth surface adjacent to bail wire 69 as well as having the crown segments 80d of the outer cover members 74b and 75b constructed to have reduced shoulders at 80e so as to form arcuate slots 82.

Figure 4:
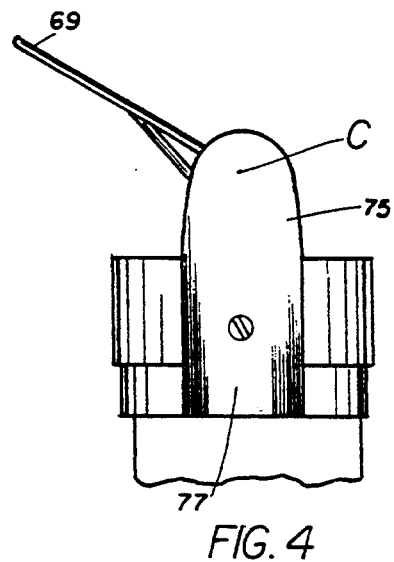
Figure 5:
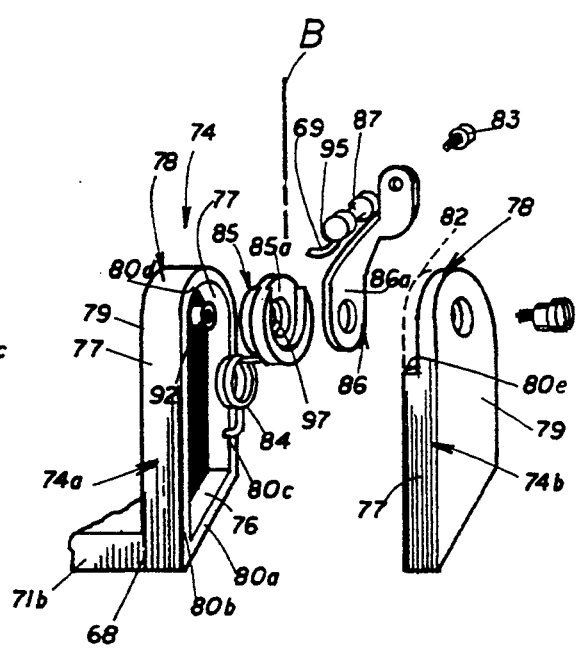

FIGS. 4 and 5 shows how the slots 82 accommodate bail wire 69 in detail. As shown in FIG. 5, the bail wire 69 is attached to a roller 87 attached to a bail arm 86 by a bolt 83. The bail arm 86 includes a hub 86a attached within recess 85a of slotted bearing 85. The bearing 85 includes a crown 85b and a brim 85c, the latter being constructed to have an outer circumferential surface alignable with the outer termini of crown section 78 of the outer cover member 74b at least over the apex segment of the slot 82 to present non-snag surfaces to the fishing line (not shown). If the crown section 78 of the cover member 74b has a radius of formation R and brim 85c is defined by a diameter D, then D=2 R. The width of the brim 85c is slightly less than that of the slot 82 to allow rotation of the former. A bail spring 84 has ends positioned between the cover member 74a and crown 85b of the slotted bearing 85 to complete the assembly; the spring 84 is loaded as function of rotation of the bail wire 69 in a first direction.

Figure 6:
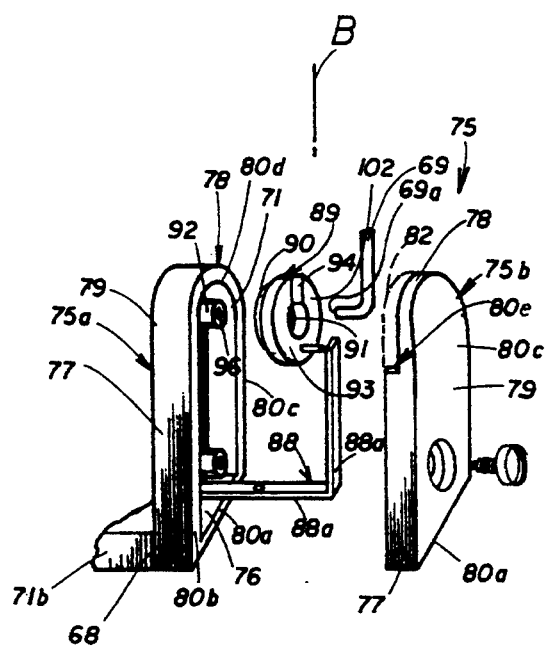
FIGS. 5 and 6 are detail exploded views of the ear assemblies of the bailing system of FIGS. 3 and 4.

As shown in FIG. 6, the other end of the bail wire 69 attaches to a pivotally operating locking-unlocking mechanism 88 that includes activating bars 88a. Bearing 89 includes a crown 90 having an opening 91 fitted over button 92 extending from cover 79 of the pair member 75a and a brim 93 fitted with a radial slot 94. The brim 93 is constructed to have an outer circumferential surface alignable with the outer termini of crown section 78 of the outer cover member 74b at least over the apex segment of the slot 82 to present non-snag surfaces to the fishing line (not shown). If the crown section 78 of the cover member 75b has a radius of formation R and brim 93 is defined by a diameter D, then D=2 R. The width of the brim 93 is slightly less than that of the slot 82 to allow rotation of the former. The radial slot 94 within the brim 93 is also shaped to capture a portion of the bail wire 69. The far end 69a of the bail wire 69 fits interior of central opening 96 and thence into the button 92.

In casting position, the position of the bail wire 69 locks the reel against rotation via operation of the locking pawl mechanism 88 within ear assembly 75. Such positioning occurs by pivoting the Cee-shaped bail wire 69 in a first direction relative to the assemblies 74, 75. Such movement loads the bail spring 84 so that re-rotation of the bail wire 69 is aided.

Note that the slots 82 of the crown segments 77 receive the bail wire 69 either directly via the slotted bearing 89, see FIG. 6 or allow the bail wire 69 to remain exterior by attachment to roller 87 wherein the off-set bail arm 86 penetrates the slot 82 of ear assembly 74 to permit attachment of the arm 86 to the slotted bearing 85, see FIG. 5.

In addition, attachment is further aided by the fact that the bearings 85, 89 each have a central opening 97, 91, respectively, to attach to integrally formed buttons 92 at to the interior surface of cover segments 79 of each ear assembly 74, 75. Such slotted bearings 85, 89 also allow easy rotation of the bail wire 96 yet fill the slot 82 to present smooth surfaces to the associated fishing line (not shown).

Note still further that the outer surface of the upright leg segments 77, the arcuate crown segments 78 and convexly formed back cover segments 79 present additional smooth, non-snagging surfaces relative to the fishing line during operations.

While the invention has been described in connection with a particular reel driving system, it will obvious to those familiar with the art that the principles could be applied to other systems as well. For example, protrusions could be integrally formed upon the drag adjusting hat 39, such protrusions being placed in direct frictional contact with the friction washer 35 (but the proviso that pressure ring 36 must be eliminated from the drag stack 33). While the invention was been described in conjunction with preferred embodiments thereof, it is obvious that modifications and changes therein may be made without departing from the spirit and scope of the invention as defined by the following claims.

What is claimed is:

1. In a spinning reel having non-snagging bail characteristics, the combination comprising a reel body; a handle rotatably supported on said reel body, a main shaft supported on said reel body having a longitudinal axis of symmetry; a spool member rotatable and slidable on said shaft to define an axis of drag rotation coincident with said longitudinal axis of symmetry, a fishing line carried on said spool member, said spool member including a bushing face at a remote end and stop means positioned on said shaft to limit sliding movement of said spool member relative to said shaft; a pressure ring slidably carried on said shaft so as to be centered thereon and being rotatably fixed to said shaft; friction washer means interposed between said pressure ring and said bushing face of said spool member; a drag adjustment nut threaded on said shaft to push said pressure ring, said friction washer means and said spool member axially into sandwich engagement with each other against said stop means to define a drag stack, rotor means connected about said drag stack wherein there is relative axial and rotatory movement therebetween, said rotor means including a rotor rotationally connected to said handle about said longitudinal axis, and a pair of diametrically positioned ear assemblies cantilevered from but support by said rotor to rotate therewith, each of said ear assemblies including a pair of members having common longitudinal and lateral dimensions, mating edges that clamp together, and walls forming a central cavity open at one end of said members remote from said rotor, and bail wire means connected to said members within said central cavity and extending from said members through said open end of said cavity, said walls of said pair of members being arcuately formed at said open end of said cavity to form aligned crown segments of common arcuate shape, said mating edges and said crown segments providing non-snagging surfaces to said fishing line.

2. The combination of claim 1 in which said crown segments of one of said ear assemblies form a concave apex section of radius R remote from said rotor and wherein said bail wire means includes an off-set bail arm penetrating through said open end of said cavity of said one of said ear assemblies.

3. The combination of claim 2 in which bail wire means also includes a Cee-shaped bail wire having a first end attached to said bail arm at an end segment of said bail arm remote from said open end of said central cavity of said members, said bail arm being pivotally attached to one of said members to permit said arm to pivot with respect to said open end of said cavity.

4. The combination of claim 3 further comprising a first slotted bearing attached to said bail arm and pivotable in concert with pivotal movement of said bail arm, said first slotted bearing being pivotally attached to said one of said members within said central cavity, said first slotted bearing having a crown and a brim attached to said crown defining a circumferential edge of diameter D, said circumferential edge being alignable within said open end of said cavity and shaped to conform to the shape of said crown segment over said apex section to present non-snag, smoothly shaped surfaces to said fishing line.

5. The spinning reel of claim 4 in which D=2R.

6. The combination of claim 4 in which said circumferential edge of said brim of said first slotted bearing includes a radial slot in which said off-set bail arm is mounted whereby said first slotted bearing and said bail arm move in concert.

7. The combination of claim 6 further comprising a spring having ends attached within said cavity of said one of said ear assemblies between one of said walls of said members and said crown of said first slotted bearing.

8. The combination of claim 2 in which said crown segments of the other of said ear assemblies form a concave apex section of radius R remote from said rotor and wherein said bail wire means includes a Cee-shaped bail wire having a L-shaped end segment penetrating through said open end of said cavity of said other of said ear assemblies, said L-shaped end segment being pivotally attached to at least one of said members within said cavity to permit said L-shaped end segment to pivot with respect to said open end of said cavity.

9. The combination of claim 8 further comprising a second slotted bearing attached to said L-shaped end segment of said bail wire means of said other of said ear assemblies within said cavity, said second slotted bearing being pivotally attached to at least one of said members within said central cavity, said second bearing having a crown and a brim attached to said crown defining a circumferential edge of diameter D, said circumferential edge being alignable within said open end of said cavity and being shaped to conform to the shape of said crown segment over said apex section to present non-snag, smoothly shaped surfaces to said fishing line.

10. The spinning reel of claim 9 in which D=2R.

11. The combination of claim 9 in which said circumferential edge of said brim of said second slotted bearing includes a radial slot in which said a portion of said Cee-shaped bail wire is mounted whereby said second slotted bearing and said bail wire move in concert.

12. A spinning reel comprising a reel body; a handle rotatably supported on said reel body, a main shaft supported on said reel body having a longitudinal axis of symmetry; a spool member rotatable and slidable on said shaft to define an axis of drag rotation coincident with said longitudinal axis of symmetry, a rotatory shaft rotationally connected to said handle having an axis of rotation coincident with said axis of drag rotation, a rotor connected to said rotatory shaft axially positioned adjacent to said spool member, said spool member including a bushing face at one remote end opposite to said rotor and stop means positioned on said main shaft to limit sliding movement of said spool member relative to said main shaft; a pressure ring slidably carried on said shaft so as to be centered thereon and being rotatably fixed to said main shaft and being rotatably fixed to said main shaft; friction washer means interposed between said pressure ring and said bushing face of said spool member; a drag adjustment nut threaded on said main shaft to push said pressure ring, said friction washer means and said spool member axially into sandwich engagement with each other against said stop means to define a drag stack, said rotor including a pair of diametrically positioned ear assemblies cantilevered from but support by said rotor to rotate therewith, each of said ear assemblies including a pair of members having common longitudinal and lateral dimensions, mating edges that clamp together, and walls forming a central cavity open at one end of said members remote from said rotor, and bail wire means connected to said members within said central cavity and extending from said members through said open end of said cavity, said walls of said pair of members being arcuately formed at said open end of said cavity to form aligned crown segments of common arcuate shape, said mating edges and said crown segments providing non-snagging surfaces to an associated fishing line.

13. The spinning reel of claim 12 in which said arcuate crown segments of each of said ear assemblies form a concave apex section of radius R remote from said rotor.

14. The spinning reel of claim 13 further comprising a first slotted bearing pivotally attached to at least one of said members within said central cavity of one of said ear assemblies and pivotally movable in concert with pivotal movement of said bail wire means, said first bearing having a crown pivotally attached to at least one of said members of said one of said ear assemblies within said central cavity and a brim attached to said crown defining a circumferential edge of diameter D, said circumferential edge being alignable within said open end of said cavity and shaped to conform to the shape of said crown segment over said apex section to present non-snag, smoothly shaped surfaces to said associated fishing line.

15. The spinning reel of claim 14 in which $D=2R$.

16. The spinning reel of claim 14 further comprising a second slotted bearing pivotally attached to at least one of said members within said central cavity of the other of said ear assemblies and pivotally movable in concert with pivotal movement of said bail wire means, said second bearing having a crown pivotally attached to at least one of said members of said other of said ear assemblies within said central cavity and a brim attached to said crown defining a circumferential edge of diameter D, said circumferential edge being alignable within said open end of said cavity and shaped to conform to the shape of said crown segment over said apex section to present non-snag, smoothly shaped surfaces to said associated fishing line.

17. The spinning reel of claim 16 in which $D=2R$.

18. The spinning reel of claim 16 in which said bail wire means includes a Cee-shaped bail wire having a L-shaped end segment and wherein said second slotted bearing includes a radial slot in which a portion of said L-shaped end segment is mounted to permit rotation of said bail wire and said second slotted bearing in concert.

19. The spinning reel of claim 14 in which said bail wire means includes a Cee-shaped bail wire and a bail arm and wherein said first slotted bearing includes a radial slot through said circumferential edge of said brim sized in which said bail arm is mounted to permit rotation of said bail arm and said first slotted bearing in concert, said bail arm including a hub attached interior of said first slotted bearing and an end segment remote from said hub and exterior of said cavity attached to said Cee-shaped bail wire.

* * * * *